United States Patent [19]

Holowczenko

[11] Patent Number: 4,883,423
[45] Date of Patent: Nov. 28, 1989

[54] METHOD FOR MAKING AN INFRARED BURNER

[75] Inventor: Alex Holowczenko, Kirkville, N.Y.

[73] Assignee: Carrier Corporation, Syracuse, N.Y.

[21] Appl. No.: 348,369

[22] Filed: May 8, 1989

[51] Int. Cl.⁴ ............................................. F23D 14/12
[52] U.S. Cl. .................................... 431/328; 431/326;
264/45.3; 264/46.4; 264/46.7; 264/46.9;
264/59; 501/95
[58] Field of Search .................... 431/7, 170, 328, 326,
431/329; 126/92 AC, 91 A; 264/43.59, 63, 45.3,
46.4, 46.7, 46.9, 70, DIG. 70; 501/95

[56] References Cited

U.S. PATENT DOCUMENTS

| 3,179,156 | 4/1965 | Weiss et al. | 431/329 |
| 3,191,659 | 6/1965 | Weiss | 431/328 |
| 4,746,287 | 5/1988 | Lannutti | 264/45.3 |

*Primary Examiner*—Randall L. Green
*Attorney, Agent, or Firm*—A. Dean Olson

[57] ABSTRACT

An infrared burner with an extremely low pressure drop is described. The burner comprises a corrosion resistant mesh screen having a thick porous coating of ceramic fibers deposited thereon. In addition to a low pressure drop the burner has structural integrity and ability to generate radiant energy at a high rate. The burner is produced by admixing alumina and ceramic fibers with a clathrate-forming halocarbon material which is removed upon drying.

8 Claims, 1 Drawing Sheet

METHOD FOR MAKING AN INFRARED BURNER

CROSS-REFERENCE TO RELATED APPLICATION

Attention is directed to U.S. patent application Ser. No. 306,128, allowed, filed Feb. 6, 1989, which discloses a similar article.

1. Technical Field

The field of art to which this invention pertains is infrared burners, and specifically composite infrared burners.

2. Background Art

Radiant energy burners made up of a supporting screen coated with a mixture of ceramic fibers are known. In operation the fibers are assembled such that they are permeable to gaseous fuel and the fuel is combusted on the outer surface of the element to primarily emit radiant energy. A variety of designs and methods for making such burners is described in the art, note U.S. Pat. Nos. 3,179,156; 3,275,497; 4,519,770; 4,599,066; and 4,721,456. However, there is a constant search in this art for more efficient burners as energy costs rise.

DISCLOSURE OF INVENTION

A method of making an infrared burner, comprising a corrosion resistant mesh screen having deposited thereon a thick porous coating of ceramic fibers, is described. The fibers are selected in size and distribution so that the resultant burner has improved structural integrity and the ability to release radiant energy at the rate of 80,000 to 100,000 BTUs per sq. ft. per hour. The porosity of the fiber laying is such as to produce a difference in pressure drop during operation of less than 0.4 inch of water and a pressure drop cold versus hot of less than or equal to 0.20 inch of water. The method comprises admixing colloidal alumina, ceramic fibers, and a clathrate-forming halocarbon in a carrier. While keeping the mixture uniformly suspended, the mixture is cooled to a temperature below the clathrate-forming temperature. The mixture is kept uniformly suspended and a mesh screen substrate is immersed into the mixture. A vacuum is pulled through the screen for a period of time sufficient to deposit a coating up to 0.5 inch thick. Following deposition, the coating is air dried or heated to allow the clathrate to melt forming small void areas in the deposited mixture. The resultant article has the properties described above, in addition to being smooth and structurally stable.

The foregoing and other features and advantages of the present invention will become more apparent from the following description and accompanying drawings.

BEST MODE FOR CARRYING OUT THE INVENTION

Figure 1:
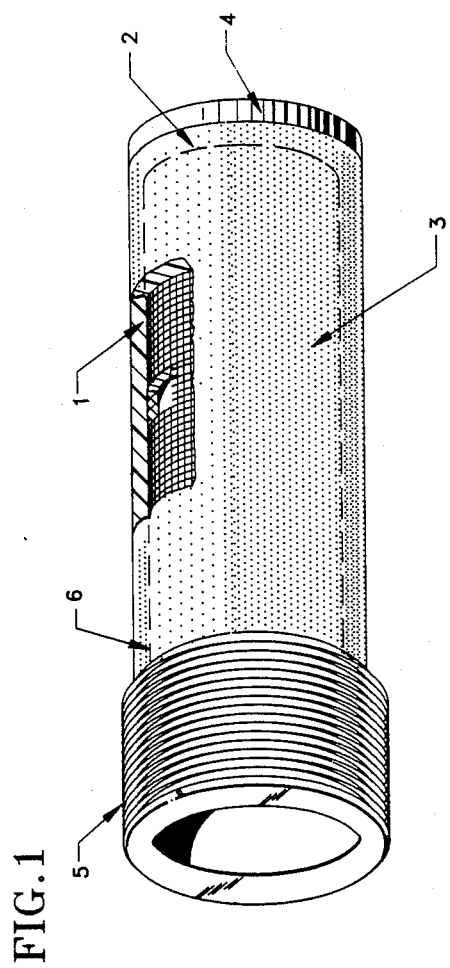
FIG. 1 shows an infrared burner according to the present invention.

The mesh screen can be any material which is corrosion resistant under the gas and heat environment prevalent with an infrared burner of this type. Commercially available stainless steel is most preferred. While any mesh size opening sufficient to hold the ceramic fibers while allowing adequate porosity to accomplish the purposes of the invention can be used, mesh sizes less than 0.25 inch on a side are preferred, 0.125 inch on a side being most preferred.

The ceramic fibers used are preferably commercially available high temperature stable fibers such as alumina and silica. These can be purchased from such sources as C & E Refractories, Buffalo, N.Y. A key to the desired porosity is the fiber length. The fibers deposited by the current process should be less than 0.25 inch and preferably about 0.125 inch in length (average fiber length). The fibers are typically deposited on the screen at a thickness of about 0.25 to about 0.5 inch thick. (If the coating is too thin the screen will heat up during operation). The mesh screen is typically formed into a cylinder with an end cap and cross-sectional area which are preferably circular, although square, rectangular, or oval end caps and cross sectional areas are also usable. It should also be noted that, e.g., such things as donut or spherical shapes can be used depending on the heat exchanger shape.

The ceramic fibers are typically about 2 inches long as purchased and their ultimate particle size is determined by chop-time. They are typically chopped to the proper length in a conventional high speed chopper (e.g., Oster blender). The ceramic fibers are typically a mixture of alumina and silica, with up to 70% by weight silica, and typically 51% alumina and 49% silica.

The ceramic fibers are deposited out of a slurry which must be uniformly dispersed in order to produce a uniform coating with uniform emissive properties. Use of a sparger best produces such a mixture. By sparging the container containing the ceramic fiber slurry with a non-reactive gas such as air pumped (typically at about 10 to 15 p.s.i. mercury) through a plate or tubing at the bottom of the vat, the mixture is better kept in suspension providing for uniform distribution of the components in the mixture onto the screen. A system of paddles may also be used. Also, by virtue of the sparging in this fashion it is believed that small bubbles may be trapped in the fiber matrix as it is deposited, further contributing to the porosity of the mat on the burner screen. This assists in obtaining the low pressure drop. Other deposition methods can also be used, e.g., spraying, but uniform coating is essential.

While any halocarbon which can form a clathrate with the carrier (preferably water) can be used in the process, CFC's (chloro-fluro-carbons) are preferred and DuPont R-113 (70° F. boiling point) is particularly preferred. It is believed that the chemical structure for DuPont R-113 is $CCl_2FCClF_2$. Other chloro-fluro-carbons which can be used are R-123, R-114, R-112 and R-22. Mixtures of these materials can also be used. Clathrate-forming compounds are added right after the fibers are added to the mixture and the clathrate is formed by the cooling which takes place as a result of evaporation of some of the compound.

Operation of the burner is typically accomplished by running a gas such as a natural gas-air mixture through the burner with an excess of air. The gas-air mixtures used in operating the burner, and generating the pressure measurements recited throughout is typically a mixture of more than 10 parts of air to 1 part of fuel (e.g., natural gas—96% methane, and a propane and butane mix). Typically 10% to 15% excess (required for stoichiometric combustion of the fuel) air is used, or approximately 11+ parts air per part of fuel.

The slurry is made up by acidifying an alumina suspension to keep everything uniformly dispersed. Typically Versal TM alumina (Kaiser Chemicals, Baton Rouge, La.) is used at a pH of about 2. This produces a homogeneous gel with about a 0.5% solids content. The fibers may be initially soaked in an acid solution for suspension purposes. (This aids the gel in penetrating the fibers by following the acid in). The fibers may be chopped either in the alumina suspension or in water and then added to the alumina. The advantage of chopping the fibers in water and then adding them to the alumina is that you know the fiber length prior to addition to the alumina. The advantage of chopping in the Versal is that it produces stronger bonding characteristics believed to be the result of the alumina attaching to the fibers versus the water attaching to the fibers and then the alumina having to penetrate the water layer. The optional soaking of the fibers in Versal alumina is accomplished in a period of time long enough to coat the fibers, typically 15 to 30 minutes.

The end cap can be produced by merely painting a ceramic slurry onto the top of the screen thick enough (typically ⅛ to ¼ inch) to eliminate any porosity allowing it to withstand the heat but not generate any radiation.

The pressure drop produced is a critical part of the invention. It is important that the pressure drop be very low. In the past fine fibers were used to produce an even coating, but this resulted in a very high pressure drop through the fibrous coating. The problem of just switching to longer fiber lengths is that this can produce adjacent bumps causing localized hot spots. Uniform mixing helps to avoid this. The pressure drop of the burner according to the present invention is less than or equal to 0.4 inch (of water) and preferably 0.1 inch to 0.4 inch. The low pressure drop reduces power requirements for a draw-through inducer fan resulting in increased energy efficiency. The other advantage of the burner according to the present invention is that the pressure drop cold (at startup) versus the pressure drop hot (at operating temperature) has a difference of less than or equal to 0.2 inch and preferably less than or equal to 0.15 inch (water column).

In FIG. 1 which is a perspective view partly broken away and partly in cross-section of a cylindrical mesh screen (1) with a closed end (2), the coating (3) on the side wall portion of the screen (1) is a porous material with a very low pressure drop. The end cap portion (4) is nonporous, i.e., permits no gas flow therethrough. A threaded coupling (5) is attached (e.g., by welding or bonding) at the open end (6) of the cylindrical screen. The coupling can be plastic, steel tube, sheet metal, etc.

Figure 2:
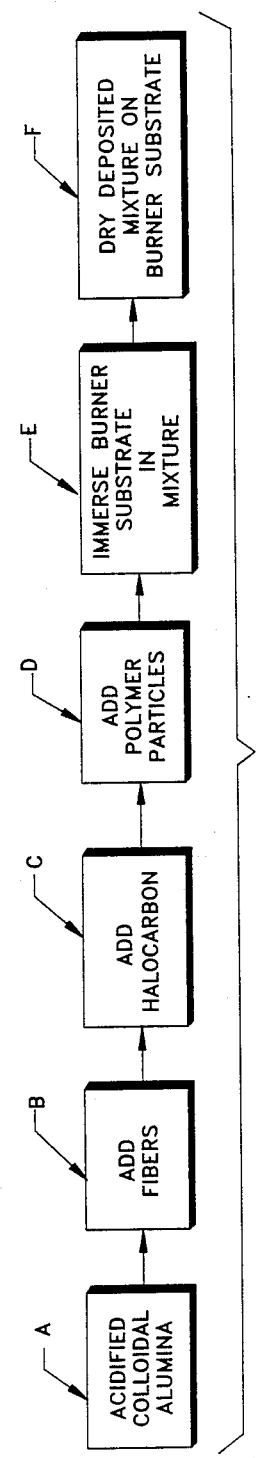
FIG. 2 shows a schematic of the process used to produce the article according to the present invention.

In FIG. 2 a flow chart of the method is described where in step "A" colloidal alumina is acidified typically to a pH of less than 2, e.g., using glacial actic acid. (The carrier used throughout the process is preferably water, although alcohols can be used.) This forms a gel at this pH. In step "B" the fibers are also added to the mixture. Although the fibers can be chopped in a carrier such as water and added to the mixture it is also possible as stated above to add the fibers in the as-purchased or as-delivered length (typically 2 to 3 inches) and chop the fibers in the slurry. This seems to produce a better wetting of the fibers by the mixture. At this point the pH is again adjusted, this time to neutral with ammonium hydroxide to maintain the gel but reduce corrosiveness of the mixture.

In step "C" the clathrate-forming material is added to the mixture with stirring to agitate the mixture. Typically R-113 is added to the mixture by pouring it in while sparging the mixture. In step "D" the screen shown in FIG. 1 is immersed in the solution and a constant, controlled vacuum pulled (typically −5 to −20 inches mercury) to deposit an even coating on the substrate (typically less than 15 seconds). This is followed in step "E" the deposited coating This drying takes place overnight at room temperature, or 2 to 3 hours in an oven starting at room temperature and ending at a temperature of approximately 212° F. Over the course of this gradient, the halocarbon is first removed followed by the removal of water or other carrier.

EXAMPLE In the following example the ingredients make approximately 3000 grams of solution, which is sufficient to coat a burner screen 2 inches in diameter and 12 inches long (0.8 square foot surface area).

Procedure to make a double batch:
(1) Prepare acidified Versal 900 by mixing 15 g of powder to 2 liters of water in a vessel with a paddle stirrer and then acidify to pH<2 using glacial acetic acid. At indicator (bromocresyl purple) and detect a color change from purple to yellow.
(2) Take one liter of water and add 30 g of fiber. Chop in a blender for 20–25 seconds. Add this composition to the composition of step 1. (Readjust the pH to <2 if necessary). It should also be noted that the target fiber length is approximately ⅛ inch.
(3) Neutralize the solution by adjusting the pH to neutral (6.5) with ammonium hydroxide. Color change will be from yellow to purple.
(4) Add 200 milliliters of R-113. This is poured into the mixture and since it is heavier than the water carrier it will sink down. By sparging it (although a paddle stirrer may also be used) the solution will roll. The R-113 gets entrapped in this slurry, no longer being a separate phase. This mixing takes place typically over the period of about 5 to about 10 minutes depending on how fast the sparging or paddle mixing is run. If the mixing is run for too long the R-113 may begin to boil off. This results in the R-113 being physically entrapped within the gel.
(5) Pour the mixture into a vacuum forming vessel of adequate size and use an air sparger or paddles to keep the fibers and other components evenly mixed in the solution.
(6) Form the burner while the solution is being mixed or within minutes (e.g., 10) after mixing.
(7) Dry the burner at room temperature for about 24 hours until all of the carrier (water) has been removed or for about 2 hours at 212° F. (Typically, the amount of clathrate in the coating is about 0.15% solids).

It should be noted that sufficient halocarbon should be used to produce the porosity to obtain the pressure drops required. Too much of the halocarbon will simply sit on the bottom of the mixing vessels. Too little will not provide sufficient porosity. This will result in higher pressure drops. Typically about 100 ml to 200 ml of halocarbon is used with the above amounts of Versal (at least 0.5 grams) and fiber (about 25 to 35 grams) in a water carrier (about 3 liters). About 20 grams of the mixture is typically collected on the screen.

In addition to having a low pressure drop both during operation and cold versus hot, the infrared burners of the present invention have structural integrity, and ability to generate radiant energy at a high rate. This makes for a very energy efficient system. Examples of the advantages a low pressure drop cold versus hot produces are: (1) only one inductor fan speed is necessary for both startup and normal operating conditions in a furnace-type environment for this type of a burner; (2) only one sensor is needed for the fans speed; (3) smaller inductor fan can be used; (4) a multi-speed motor is not necessary; and (5) there are fewer control complications in such a system. It should also be noted that with a burner according to the present invention, the structural integrity has resulted in over 4,000 hours of testing without structural integrity failure. One of the keys to the present invention is the balance of properties obtained, a balance of surface smoothness, structural integrity, and the pressure drops recited.

Although this invention has been shown and described with respect to detailed embodiments thereof, it will be understood by those skilled in the art that various changes in form and detail thereof may be made without departing from the spirit and scope of the claimed invention.

I claim:

1. A method of making an infrared burner comprising:
   (a) admixing alumina, ceramic fibers, a binder, a carrier, and a clathrate-forming halocarbon, while keeping the mixture uniformly suspended;
   (b) cooling the mixture to a temperature below the clathrate-forming temperature;
   (c) depositing the mixture onto a mesh screen substrate; and
   (d) drying the screen at a temperature sufficient to melt the clathrate and evaporate the carrier forming small void areas in the deposited mixture;

thereby producing a porous coating on the screen having structural integrity, the ability to generate radiant energy at a rate of 80,000 BTU to 100,000 BTU per sq. ft. per hour, a pressure drop during operation of less than 0.4 inch of water, and a pressure drop cold versus hot of less than 0.20 inch of water.

2. The method of claim 1 wherein the carrier is water and the clathrate-forming temperature is 32° F.

3. The method of claim 2 wherein the cooling takes place by agitating the mixture.

4. The method of claim 2 wherein the drying cools the deposited mixture by evaporation of the halocarbon producing resistance to slumping.

5. The method of claim 3 wherein the agitation is produced by sparger or paddle stirring of the mixture.

6. The method of claim 1 wherein the pressure drop cold versus hot is up to 0.15 inch of water.

7. The method of claim 1 wherein the carrier is water.

8. The method of claim 1 wherein the halocarbon is $CCl_2FCClF_2$.

* * * * *